United States Patent [19]
Graham

[11] Patent Number: 5,406,711
[45] Date of Patent: Apr. 18, 1995

[54] FIXTURE FOR ENABLING MARKING AND CUTTING A STRAIGHT LINE

[76] Inventor: Michael J. Graham, 2635 23rd St. #A, Santa Monica, Calif. 90405

[21] Appl. No.: 43,156

[22] Filed: Apr. 5, 1993

Related U.S. Application Data

[63] Continuation-in-part of Ser. No. 864,429, Apr. 6, 1992, abandoned.

[51] Int. Cl.[6] ............................ G01B 3/10; B43L 7/00
[52] U.S. Cl. ......................................... 33/42; 33/760; 33/770; 33/668
[58] Field of Search .............. 33/761, 759, 760, 768, 33/769, 770, 42, 43, 44, 41.1, 668, 32.2

[56] References Cited

U.S. PATENT DOCUMENTS

| | | |
|---|---|---|
| 311,584 | 2/1885 | Hunt et al. |
| 356,533 | 1/1887 | Hall . |
| 452,677 | 5/1891 | Morrill . |
| 523,380 | 7/1894 | Snell . |
| 1,491,437 | 4/1924 | Taylor . |
| 1,599,852 | 9/1926 | Thomas . |
| 2,549,503 | 4/1951 | McCully . |
| 2,563,674 | 8/1951 | Coots ............................ 33/761 X |
| 2,795,050 | 6/1957 | Van Fleet . |
| 3,160,957 | 12/1964 | Phillips . |
| 3,181,242 | 5/1965 | Cook . |
| 3,192,630 | 7/1965 | Dineson . |
| 3,509,631 | 5/1970 | Shimoyama ..................... 33/761 X |
| 3,744,134 | 7/1973 | Zima, Jr. . |
| 3,823,481 | 7/1974 | Chapin . |
| 3,824,695 | 7/1974 | McClay ............................ 33/759 |
| 3,842,510 | 10/1974 | Elliott . |
| 4,113,199 | 9/1978 | Marino . |
| 4,438,538 | 3/1984 | Larsen . |
| 4,642,898 | 2/1987 | Miller ............................ 33/761 |
| 4,890,393 | 6/1990 | St. Jean . |
| 4,965,941 | 10/1990 | Agostinacci . |
| 5,020,235 | 6/1991 | Martin ............................ 33/768 |

FOREIGN PATENT DOCUMENTS 2203839 10/1988 United Kingdom ................. 33/42

Primary Examiner—Christopher W. Fulton
Attorney, Agent, or Firm—Macro-Search Corp.

[57] ABSTRACT

An apparatus is provided for enabling the marking and cutting on a straight line on an upper surface of a workpiece. A guide has a side guide surface, a top guide surface, and a base. The side guide surface and the top guide surface are mutually orthogonal. A clamp supports a case of a reeled measuring tape on the base. The damp has a fixed clamping surface and a movable clamping surface. The movable clamping surface is adjustable to contact one side of the reel case while the fixed clamping surface contacts the opposing side of the reel case, whereby the reel case is held fixedly and the holding means may hold any one of a wide range of reel case widths. The measuring tape has an engagement tongue protruding from the leading edge thereof, and the case of the measuring tape has a reel lock for fixing the tape in a position extended from the case. A hand tool, such as a knife or marking implement, works in cooperation with the guide and has an engagement slot. The tongue of the measuring tape engages the slot of the hand tool, thereby connecting the hand tool to the tape. The side guide surface and the top guide surface slide along an edge of a workpiece while the hand tool moves along the upper surface of the workpiece, such that a line is cut or drawn into the upper surface at a fixed distance from the edge of the workpiece.

5 Claims, 2 Drawing Sheets

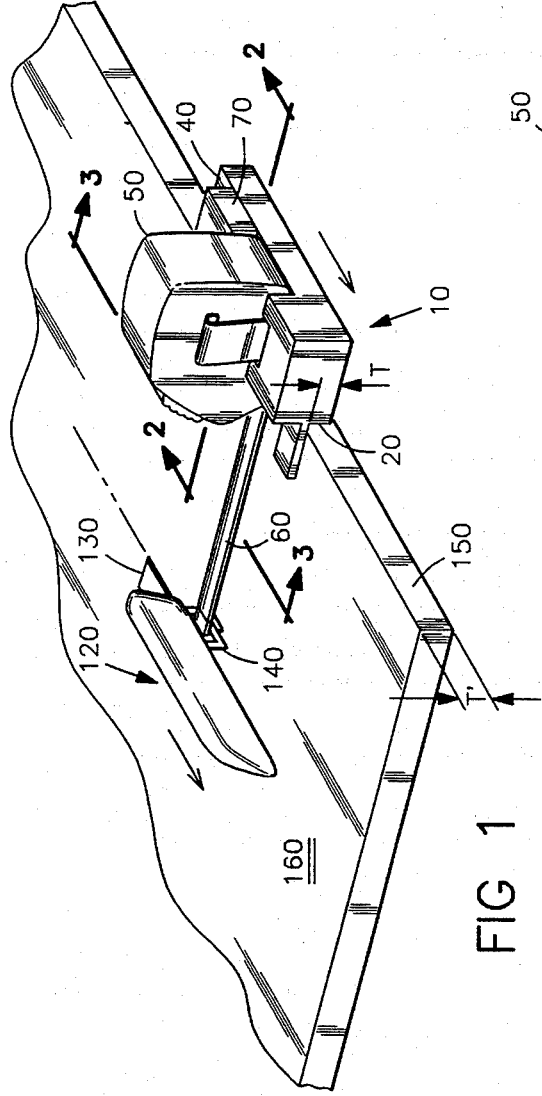

FIXTURE FOR ENABLING MARKING AND CUTTING A STRAIGHT LINE

This is a continuation-in-part of application Ser. No. 07/864,429, filed Apr. 6, 1992, abandoned.

FIELD OF THE INVENTION

This invention relates generally to guides and, more particularly, to a guide for a measuring tape working in combination with a cutting knife.

BACKGROUND OF THE INVENTION

When cutting a workpiece such as a portion of dry wall, vinyl flooring, and the like, it is important to make cuts that are both straight and accurate. To accomplish this, a worker typically uses a measuring tape to accurately determine at least two points on the surface through which a straight cut must pass. Then a straight edge is aligned with the two points as a guide for a knife to cut the workpiece.

It has been observed that cutting such a workpiece accurately could take less time if the measuring and cutting steps of the process were combined. Several prior art devices are available to assist the worker in guiding a measuring tape along a workpiece while either cutting or marking the workpiece. For example, a device disclosed in U.S. Pat. No. 3,192,630 to Dineson on Jul. 6, 1965, illustrates a guide piece that is fixedly attached to a tape measure case and includes separate marking and cutting attachments for the leading edge of the measuring tape. Such a device, however, is ill-suited for fitting on a prior existing tape measure device. As such, to use such a device one would have to purchase a new tape measure that includes the device. Moreover, the cutting and marking attachments do not provide a convenient location for grasping, and are therefore difficult to use. Additionally, such cutting and marking attachments, as disclosed in Dineson, are preferably permanently attached to the measuring tape; there is no structure indicated that would allow a temporary attachment thereof. When such a cutting attachment becomes dull through use, for example, a new device must be purchased. Clearly this is a significant drawback to such a device and an indication of why such a device has not been prominent in the marketplace.

Other guide devices are available for use with prior existing tape measure devices. For example, U.S. Pat. No. 4,890,393 to St. Jean on Jan. 2, 1990, discloses a guide attachment for a tape measure. Such a device, however, is only suitable for one size of tape measure. Moreover, such a device does not include an attachment means of a knife or marking implement to the leading edge of the measuring tape. As such, a worker using this device must hold the end of the tape and a marking or cutting implement together during the marking or cutting operation, while also ensuring that the measuring tape remains taunt.

Clearly there is a need for a tape measure guiding device that can be used with a variety of sizes of separate tape measuring devices. Such a needed device would also be readily adaptable to work with pre-existing cutting and marking implements, would be relatively easy to use, and would be light-weight and easy to carry. Moreover, such a needed device would comprise few components, making it relatively inexpensive to manufacture. The present invention fulfills these needs and provides further related advantages.

SUMMARY OF THE INVENTION

The present invention is a device for enabling the marking and cutting on a straight line, or possibly a non-straight, controlled contour line on an upper surface of a workpiece, such as a piece of wall board. A guide has a side guide surface, a top guide surface, and a base surface. The side guide surface and the top guide surface are mutually orthogonal. A clamping means, supports the case of a reeled measuring tape on the base surface. Preferably, the clamping means has a fixed clamping surface and a movable clamping surface. The movable clamping surface is adjustable to contact one side of the reel case while the fixed clamping surface contacts the opposing side of the reel case, whereby the reel case is held fixedly and the clamping means may hold any one of a wide range of reel case widths.

The measuring tape is of the type having an engagement tongue protruding from the leading edge of the tape. Such an engagement tongue is typically used for holding the end of the tape to one side of an object being measured, such as a door or wall board. The case of the measuring tape is of the type having a reel lock for fixing the tape in a position extended from the case.

A hand tool, such as a cutting knife or marking implement, works in cooperation with the guide. The hand tool has an engagement slot for engagement with the tongue of the measuring tape, such that the hand tool can be held in fixed relationship with respect to the tongue of the measuring tape.

In operation, a tape measure case is secured to the clamping means of the guide. The guide is then positioned so that the side guide surface may slide freely along a side edge of a workpiece, and so that the top guide surface may slide freely along the upper surface of the workpiece. The tape is extended a measured distance across the upper surface of the workpiece and the reel lock is locked. The engagement tongue is then interlocked with the engagement slot of the hand tool, and the hand tool and guide are drawn simultaneously along the workpiece. The side guide surface and the top guide surface slide along the edge of the workpiece while the hand tool moves along the upper surface of the workpiece. In this manner a line is either marked or cut into the upper surface at a fixed distance from the edge of the workpiece. The distance is determined by the distance that the tape is extended from the case, and the shape of the line is determined by the shape of the side edge of the workpiece.

Preferably, the thickness of the base is less than the thickness of the workpiece so that the guide does not extend below the lower surface of the workpiece. Further, the guide further preferably includes a first recess for finger access to the engagement tongue of the fully retracted tape, and a second recess for clearance of a belt clip attached to the reel case.

The present invention can be used with a variety of sizes of pre-existing tape measure devices. Moreover, the hand tool of the present invention can be any of a number of prior known hand tools fitted retroactively with a relatively small engagement slot of the present invention. Further, the hand tool of the present invention provides a convenient grasping location for the worker, and allows the worker to maintain the tautness of the extended measuring tape which, in turn, increases the ease-of-use and the accuracy of the invention. The present invention comprises relatively few parts which can be manufactured inexpensively. Further, the present invention is relatively compact, light-weight, and therefore easy to carry. Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings:

FIG. 1 is a perspective illustration of a guide and knife hand tool of the present invention, illustrating a line cut into a workpiece;

FIG. 2 is a cross sectional view of the guide of FIG. 1, taken generally along lines 2—2 of FIG. 1, and illustrating a tape measuring reel and a base of the invention;

FIG. 3 is a cross sectional view of the guide of FIG. 1, taken generally along lines 3—3 of FIG. 1, and illustrating an engagement tongue of the measuring tape and a clamp of the invention.

DETAILED DESCRIPTION OF THE PREFERRED EMBODIMENT

Figure 5:
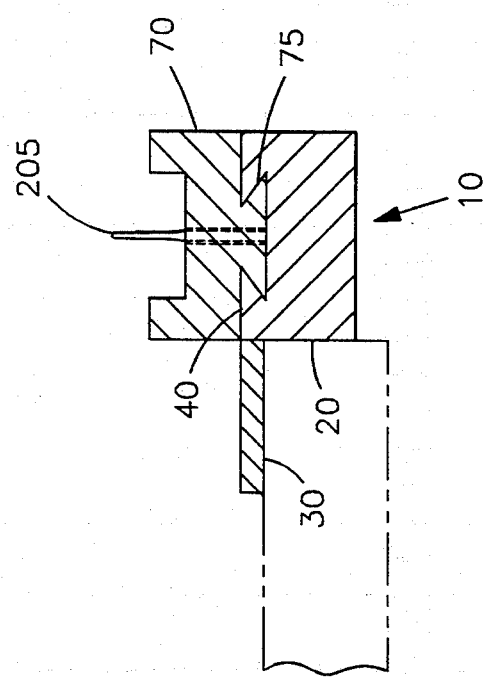
FIG. 5 is a cross sectional view of the invention, taken generally along lines 5—5 of FIG. 3, illustrating a clamping means of the invention.

FIG. 1 shows a device for enabling the marking and cutting on a straight line on an upper surface 160 of a workpiece, such as wall board, or the like. A guide 10 has a side guide surface 20, a top guide surface 30, and a base surface 40. The side guide surface 20 and the top guide surface 30 are mutually orthogonal. A clamping means 70 supports a case 50 of a reeled measuring tape 60 on the base surface 40 (FIG. 3). Preferably, the clamping means 70 has a movable clamping surface 210 which is positioned in parallel opposition to the fixed clamping surface 200 (FIG. 3). The clamping means 70 is slidably interconnected with base surface 40 through engagement means 75 preferably a tongue in groove arrangement, such that moveable clamping surface 210 may be brought into contact with one side of the reel case 50, whereby the reel case 50 is rigidly held between surfaces 200 and 210. The clamping means 70 may be adjusted to accommmodate any one of a wide range of reel case widths ranging between about ¼ inch and about 4 inches, as are commonly in use. Preferably, the guide 10 is manufactured from a strong and rigid metallic or plastic material. The tongue in groove engagement of the clamping means 70 with the base surface 40 provides clamping force rigidity against reel 50 at any position of clamping means 70 yet is inexpensive to fabricate and assemble.

The measuring tape 60 is of the type having an engagement tongue 90 protruding from the leading edge 80 of the tape 60. The case 50 of the measuring tape 60 is of the type having a reel lock 100 for fixing the tape 60 in a position extended from the case 50. A locking means 205, such as a thumbscrew is mounted on clamping means 70 to enable movable surface 210 to be locked in place against case 50.

A hand tool, such as a hand held cutting knife 120 (FIG. 1), works in cooperation with the guide 10. Alternately, the hand tool might be a marking tool 122 used with a marking implement 124 (FIG. 2). The knife 120 has a cutting blade 130 and an engagement slot means 140. The tongue 90 of the measuring tape 60 engages the engagement slot means 140 of the knife 120, thereby connecting the knife 120 to the tape 60 such that the tape 60 lies at a right angle to the direction of cut of the knife 120. Preferably the engagement slot means 140 is part of, or may be added to any cutting knife 120. It is a stamped metal part capable of being wedged between the two halves of the knife 120 and held therein by clamping action of the two halves of the knife against either side thereof.

Figure 4:
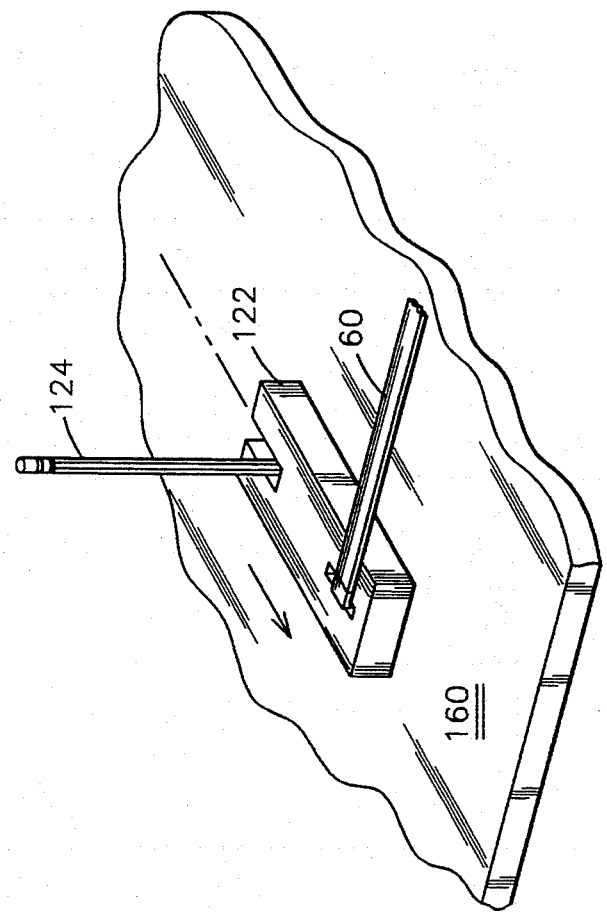
FIG. 4 partial perspective illustration of a hand tool the of present invention, illustrating a marking implement used with the hand tool for marking a line on the surface of the workpiece.

In operation, the reel case 50 is secured by the clamping means 70 onto the guide 10. The guide 10 is then positioned so that the side guide surface 20 may slide freely along a side edge 150 of the workpiece, and so that the top guide surface 30 may slide freely along a upper surface 160 of the workpiece. The tape 60 is extended a measured distance across the upper surface 160 of the workpiece and the reel lock 100 is locked. The engagement tongue 90 is then interlocked with the engagement slot means 140 of the knife 120, and the knife 120 and guide 10 are drawn simultaneously along the workpiece. The side guide surface 20 and the top guide surface 30 slide along a side edge 150 of the workpiece while the knife 120 moves along the upper surface 160 of the workpiece. In this manner a linear, or other shape, cut is made into the upper surface 160 at a fixed distance from the edge 150 of the workpiece. This fixed distance is determined by the distance that the tape 60 is extended from the case 50, and the shape of the line is determined by the confirmation of the workpiece side edge 150. Clearly, the marking tool 122 (FIG. 4) could be used in place of the knife 120 to draw a line on the upper surface 160 as opposed to cutting a line. Indeed, many different types of hand tools (not shown) could be used with the present invention by simply fitting the hand tool with an appropriate engagement slot means 140.

Preferably, the dimension T of the guide 10 is less than the thickness of the workpiece T so that the guide 10 does not extend below the lower surface of the workpiece (FIG. 2) thereby allowing the workpiece to be cut on a table surface or on the ground. Further, the guide 10 further preferably includes a first recess 170 for finger access to the leading edge 80 of the fully retracted tape 60 (FIG. 2), and a second recess 180 for clearance of a belt clip attached to the reel case 50 (FIG. 3).

While the invention has been described with reference to a preferred embodiment, it is to be clearly understood by those skilled in the art that the invention is not limited thereto. Thus, the scope of the invention is to be interpreted only in conjunction with the appended claims.

I claim:

1. A device for guiding on a side edge and upper surface of a workpiece while marking and cutting the upper surface along a line, the device comprising:
   a guide having a side guide surface for engaging sliding contact with the side edge of the workpiece, and a top guide surface for engaging sliding contact with the upper surface of the workpiece, and a base surface for supporting a reel case of a reeled measuring tape, and a clamping means providing a movable clamping surface for contacting one side of the reel case of the measuring tape in parallel opposition to a fixed clamping surface for contacting a second, opposing side of the reel case, the clamping means being slidably engaged with the base surface of the guide for sliding adjustment to accommodate reel case widths over the range of approximately one-forth of an inch to approximately four inches, for holding the reel case in a fixed position on the base surface, such that the tape is approximately parallel to the upper surface of the workpiece, the tape having an engagement tongue protruding therefrom, the case having a reel lock for fixing the tape in a desired position extended from the case for engagement with a hand tool, such that the guide and the hand tool may be drawn in coordinated movement along the workpiece, the tool being maintained at a fixed distance from the side edge by the unreeled portion of the tape reel, and wherein the guide includes a first recess immediately below the reel case, for providing finger access to the engagement tongue to more easily extend the tape from the case, and wherein the fixed clamping surface includes a second recess for clearance of a belt clip attached to the reel case whereby the fixed clamping surface is able to contact the sidewall of the reel case while avoiding contact with the belt clip.

2. The device of claim 1 further including a means for locking the clamping means at any position over a range of travel such that the movable vertical surface is positioned at a desired position for contacting the reel case.

3. The device of claim 2 wherein the locking means is a thumbscrew engaged in the clamping means and providing contact on the base surface such that a tension force is produced between the clamping means and the base surface.

4. The device of claim 1 further including engagement means for providing sliding engagement of the clamping means with the base surface.

5. The device of claim 4 wherein the engagement means is a tongue in groove arrangement.

* * * * *